United States Patent
Bosen

(10) Patent No.: US 7,193,341 B2
(45) Date of Patent: Mar. 20, 2007

(54) TURBOMACHINE FOR LOW-TEMPERATURE APPLICATIONS

(75) Inventor: Werner Bosen, Köln (DE)

(73) Assignee: Atlas Copco Energas GmbH, Köln (DE)

( * ) Notice: Subject to any disclaimer, the term of this patent is extended or adjusted under 35 U.S.C. 154(b) by 229 days.

(21) Appl. No.: 10/894,970

(22) Filed: Jul. 20, 2004

(65) Prior Publication Data

US 2005/0248221 A1 Nov. 10, 2005

(30) Foreign Application Priority Data

May 7, 2004 (DE) .................. 10 2004 023 148

(51) Int. Cl.
- H02K 9/00 (2006.01)
- F01D 15/10 (2006.01)
- F04D 29/58 (2006.01)

(52) U.S. Cl. .................. 310/54; 310/52; 310/58; 310/89; 417/366; 417/373

(58) Field of Classification Search .................. 310/52, 310/54, 55, 58, 59, 189; 62/505; 417/423.8, 417/366, 365, 373, 423.15, 423.12
See application file for complete search history.

(56) References Cited

U.S. PATENT DOCUMENTS

| | | | |
|---|---|---|---|
| 4,523,896 A * | 6/1985 | Lhenry et al. .............. 417/244 |
| 5,126,612 A * | 6/1992 | Girault ...................... 310/90.5 |
| 5,249,934 A | 10/1993 | Merritt et al. .............. 417/406 |
| 5,638,796 A | 6/1997 | Adams, III et al. ......... 123/565 |
| 5,857,348 A * | 1/1999 | Conry ......................... 62/209 |
| 5,980,218 A * | 11/1999 | Takahashi et al. .......... 417/243 |
| 6,390,789 B1 | 5/2002 | Grob et al. ................. 417/350 |
| 6,464,469 B1 | 10/2002 | Grob et al. ................. 417/251 |
| 6,729,858 B2 * | 5/2004 | Choi et al. .................. 417/365 |
| 2005/0248221 A1 * | 11/2005 | Bosen ......................... 310/54 |

FOREIGN PATENT DOCUMENTS

JP 03212137 * 9/1991

* cited by examiner

Primary Examiner—Karl Tamai
(74) Attorney, Agent, or Firm—Collard & Roe, P.C.

(57) ABSTRACT

A turbomachine for low-temperature applications, has a rotor shaft; at least one rotor disk that is arranged in overhung manner at one shaft end of the rotor shaft; an electric machine having a stator having windings, and an electric rotor arranged on the rotor shaft; a stage housing that surrounds the rotor disk and has connections for a cold gas that flows through the stage housing; and a machine housing in which the electric machine and shaft bearings for the rotor shaft are arranged. The machine housing is connected with the stage housing. A partition made of insulating material is arranged between the stage housing and the machine housing, which thermally separates the stage housing from the machine housing. A line provided with a flow-through regulation fitting is connected to the flow path of the cold gas, for branching off an amount-regulated cooling stream, which is passed to the electric machine within the machine housing.

14 Claims, 2 Drawing Sheets

TURBOMACHINE FOR LOW-TEMPERATURE APPLICATIONS

CROSS REFERENCE TO RELATED APPLICATIONS

Applicant claims priority under 35 U.S.C. §119 of German Application No. 10 2004 023 148.6 filed May 7, 2004.

1. Field of the Invention

The present invention relates to a turbomachine for low-temperature applications. The turbomachine has a rotor shaft, at least one rotor disk that is arranged in overhung manner at one shaft end of the rotor shaft, an electric machine having a stator having windings, and an electric rotor arranged on the rotor shaft, a stage housing that surrounds the rotor disk and has connections for a cold gas that flows through the stage housing, and a machine housing in which the electric machine and shaft bearings for the rotor shaft are arranged, wherein the machine housing is connected with the stage housing.

2. The Prior Art

Turbomachines known from practice, having the characteristics described initially, are operated at high speeds of rotation. Such operation causes significant heat to develop both in the electric machine and in the shaft bearings.

The turbomachines are frequently used at cryogenic temperatures, for example for compressing and transporting liquid natural gas (LNG) that evaporates, or for relaxing gases in the decomposition of air. On account of such use, the connection between the machine housing and the stage housing causes intensive heat transport from the electric machine towards the cold interior of the stage housing. This uncontrolled heat stream cools out the electric machine so much that the material of the windings becomes brittle. The windings thereby become subject to breakage due to vibrations, and any permanent magnets that are involved become demagnetized and therefore ineffective. The uncontrolled heat stream can furthermore cool the shaft bearings out very greatly, so that lubricants that are used in them solidify to the point of being unusable.

SUMMARY OF THE INVENTION

It is an object of the present invention to provide a turbomachine having the characteristics described initially, wherein on the one hand, uncontrolled cool-out of the electric machine and the shaft bearings is effectively prevented, and wherein on the other hand, at the same time, sufficient cooling of the electric machine is guaranteed.

This object is accomplished, according to the invention, by arranging a partition made of insulating material between the stage housing and the machine housing, which thermally separates the stage housing from the machine housing, and by connecting a line provided with a flow-through regulation fitting to the flow path of the cold gas, for branching off an amount-regulated cooling stream, which is passed to the electric machine within the machine housing.

By means of the heat-insulating partition, uncontrolled cool-out of the electric machine and the shaft bearings is effectively prevented, by conducting heat between the machine housing and the stage housing. The branching line connected with the flow path of the cold gas guides an amount of the cooling stream, which can be adjusted in targeted manner, to the regions of the electric machine that demonstrate the heat development described initially, and accordingly guarantees sufficient cooling, which can be precisely metered, of the electric machine. Preferably, in this regard, the line is connected with the pressure side of the flow path, in other words ahead of the turbine rotor disk, viewed in the flow direction, in the case of a turbomachine being operated as a turbine, i.e. behind the compressor rotor disk, viewed in the flow direction, in the case of a turbomachine being operated as a compressor.

It is practical if a distributor that distributes the cooling stream is connected to the line, whereby the windings and the ring gap between stator and rotor are impacted with the partial streams. In this way, it is guaranteed that precisely those regions of the electric machine that demonstrate the most intensive heat development are supplied with the cooling gas stream. In this connection, the distributor can distribute the cooling stream into several individual lines, which are connected to the machine housing at different locations. Alternatively, the distributor can be made up of distributor channels that are integrated into the wall of the machine housing. Preferably, the shaft bearings are also impacted with partial streams of the cooling stream. In this way, sufficient cooling of bearings not supplied with sufficient amounts of lubricant oil for the purpose of cooling, such as magnetic bearings or gas bearings, or roller bearings lubricated with grease or minimal oil, is also guaranteed.

Preferably, a reflux line is connected to the interior of the machine housing, which line leads back to the gas line on the low-pressure side of the stage housing, or to the low-pressure region of the stage housing itself, and allows the gas introduced into the machine housing to be returned. In this way, the cold gas introduced into the machine housing is prevented from being discharged into the atmosphere, which is particularly important in the case of toxic or flammable gases.

The electric machine can be configured as an electric motor or as a generator, and the rotor disk can be configured as a compressor rotor disk or a turbine rotor disk. Depending on the application case, a second rotor disk can be arranged, in overhung manner, on the other end of the rotor shaft. In this case, it is practical if a partition according to the invention is also correspondingly between the stage housing of the second rotor disk and the machine housing, for thermal separation of the two housings last mentioned.

The two rotor disks can be configured optionally as a compressor rotor disk or as a turbine rotor disk, in each instance, whereby the electric machine is configured correspondingly as an electric motor or as a generator. For the case that one rotor disk functions as a turbine and the other rotor disk functions as a compressor, and alternately, depending on the operating state of the rotor shaft, a supply of power or a take-off of power by the electric machine must take place, the electric machine is either a motor or a generator. As already mentioned, the shaft bearings can be configured as magnetic bearings, gas bearings, roller bearings, particularly roller bearings lubricated with grease or minimal oil, or also as hydraulic slide bearings. Depending on the application case, the machine housing can be structured as a pressure-tight capsule that is suitable for operation in environments at risk of explosion.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
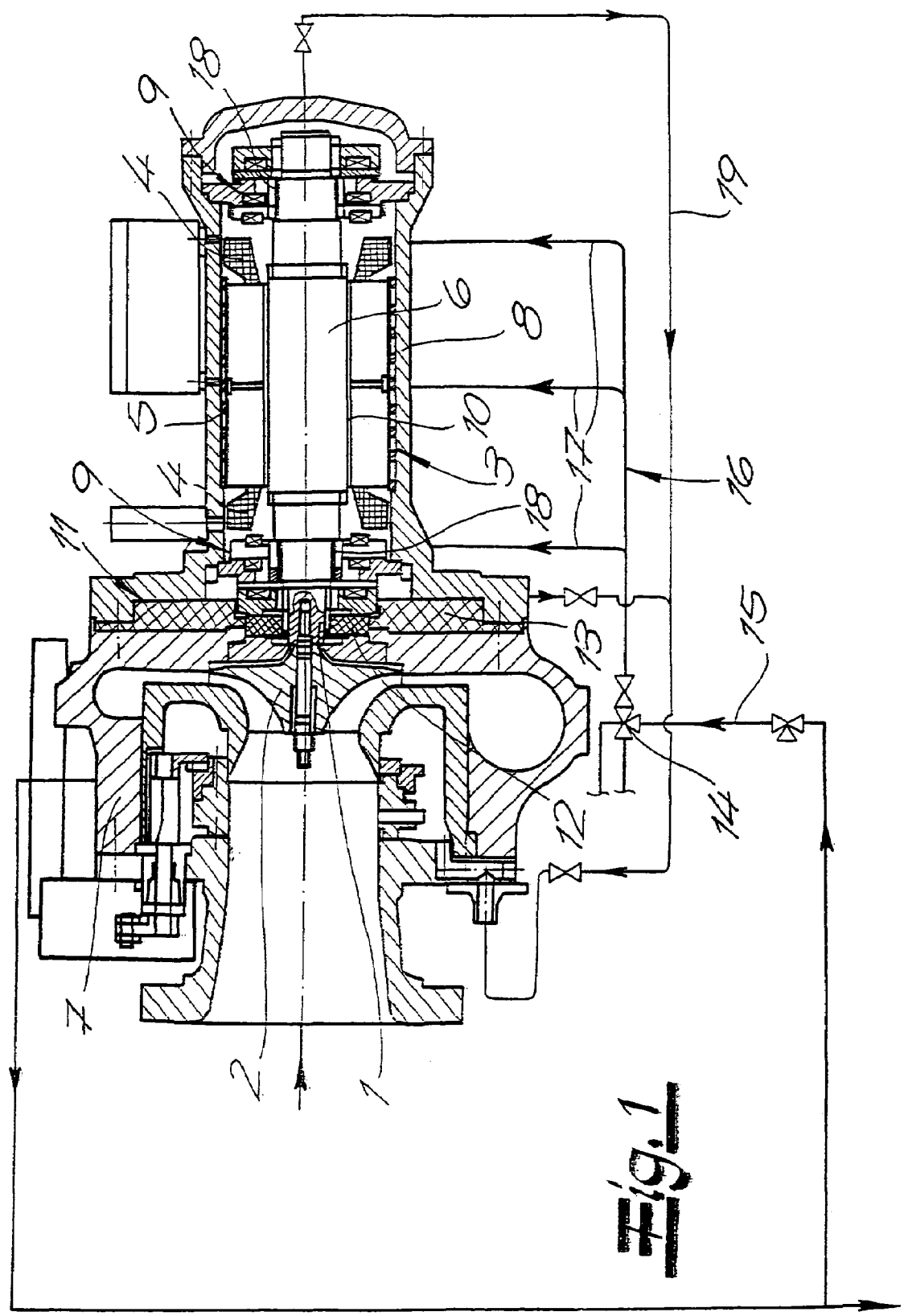
FIG. 1 is a cross-sectional view of a turbomachine according to an embodiment of the invention.

Referring now to the drawings, an in particular to FIG. 1, a turbomachine for low-temperature applications is shown. It possesses a rotor shaft 1, a rotor disk 2 that is attached at one shaft end of rotor shaft 1, in overhung manner, and an electric machine 3. Electric machine 3 includes a stator 5 that has windings 4, and an electric rotor 6 that is arranged on rotor shaft 1, so that rotor disk 2 and rotor 6 rotate at the same speed of rotation. A stage housing 7 surrounds rotor disk 2 and has connections for a cold gas that flows through stage housing 7. A machine housing 8, in which electric machine 3 and shaft bearings 9 for rotor shaft 1 are arranged, is also provided, in which shaft bearings 9 are located on both sides of rotor 6.

Machine housing 8 is connected with stage housing 7. Stator 5 is attached on the inside of machine housing 8 and spaced apart from electric rotor 6, forming a ring gap 10. A partition 11 made of insulating material, which thermally separates stage housing 7 from machine housing 8, is arranged between stage housing 7 and machine housing 8. In the exemplary embodiment, partition 11 is configured in two parts and is made up of an inner element 12 and an outer element 13. A line 15 provided with a flow-through regulation fitting 14 to branch off an amount-regulated cooling stream is connected with the flow path of the cold gas. The cooling stream is passed to electric machine 3 within machine housing 8. The cooling stream is branched off on the pressure side of the flow path of the cold gas. Because rotor disk 2 is configured as a compressor rotor disk in the exemplary embodiment, removal of the cooling stream accordingly takes place downstream of stage housing 7. A distributor 16, which distributes the cooling stream into several individual lines 17, is connected with line 15. Windings 4, ring gap 10 between stator 5 and rotor 6, and the gaps 18 of shaft bearings 9 configured as magnetic bearings are impacted by partial streams of the cooling stream, in targeted manner, by way of individual lines 17.

A reflux line 19 is connected with the interior machine housing 8. Reflux line 19 leads back to the low-pressure region of stage housing 7 and allows return of the gas introduced into machine housing 8, without any additional transport unit. Machine housing 8 is structured as a pressure-tight capsule that is suitable for operation in an environment at risk of explosion. This arrangement makes it possible to cool electric machine 3 even with a flammable cold gas, which can result in the formation of an explosive or easily flammable mixture upon contact with the ambient air. In the exemplary embodiment, natural gas at −140° C. is drawn in at ambient pressure and compressed to approximately 1 bar excess pressure, using the compressor rotor disk. In this process, the gas is heated to −110° C. Rotor disk 2 is driven by way of rotor shaft 1, which transfers a power of approximately 200 kW at 30,000 revolutions per minute in the exemplary embodiment, using integrated electric motor 3.

Figure 2:
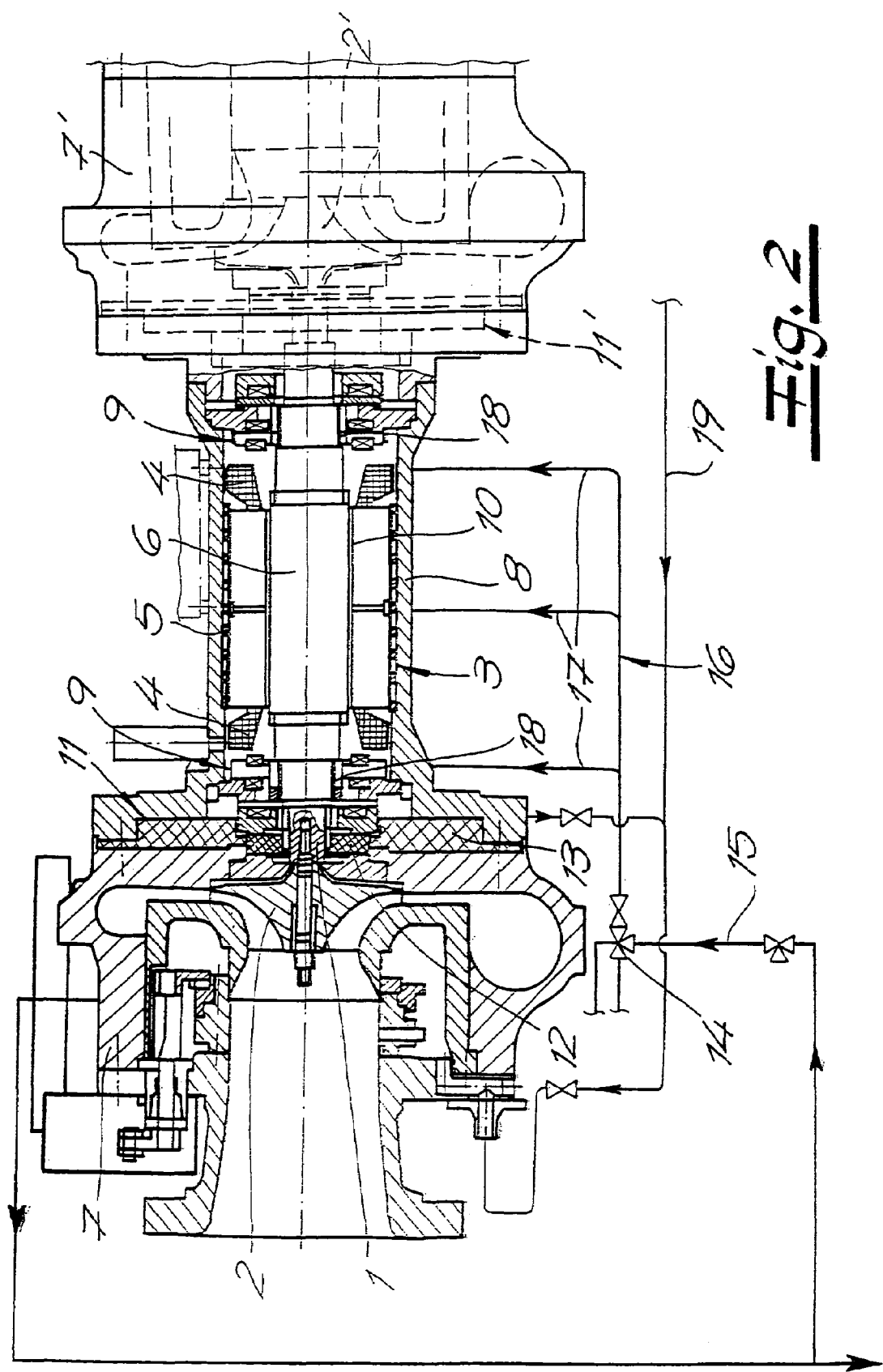
FIG. 2 shows another embodiment of the invention.

In the exemplary embodiment according to FIG. 2, a second rotor disk 2' is arranged at the other end of rotor shaft 1, in overhung manner. Stage housing 7' of second rotor disk 2', which is also used for compressing a cold gas, is thermally separated from the machine housing in a corresponding manner, by means of a partition 11' that is made of an insulation material having a very low heat conductivity number.

While only at least two embodiments of the present invention have been shown and described, it is to be understood that many changes and modifications may be made thereunto without departing from the spirit and scope of the invention as defined in the appended claims.

What is claimed is:

1. A turbomachine for use at cryogenic temperatures wherein uncontrolled cool-out is prevented comprising:
   (a) a rotor shaft having a first shaft end;
   (b) at least one rotor disk arranged in overhung manner at said first shaft end;
   (c) a stage housing surrounding said at least one rotor disk and having a plurality of connections for a cold gas flowing through said rotor disk along a flow path;
   (d) a machine housing connected with said stage housing;
   (e) an electric machine arranged in said machine housing comprising a stator having a plurality of windings and an electric rotor arranged on said rotor shaft, wherein a ring gap is arranged between said stator and said rotor;
   (f) a plurality of shaft bearings for said rotor shaft arranged in said machine housing;
   (g) a partition made of insulating material arranged between said stage housing and said machine housing, said partition thermally separating said stage housing from said machine housing and preventing an uncontrolled cool-out of the electric machine; and
   (h) a line comprising a flow-through regulation fitting connected to the flow path of the cold gas for branching off and passing an amount-regulated cooling stream to said electric machine, said line accomplishing an adjusted cooling in targeted manner of the electric machine; and
   (i) a distributor connected to said line for distributing the cooling stream into partial streams, said ring gap and said windings being impacted with the partial streams.

2. The turbomachine according to claim 1, wherein the partial streams also impact said shaft bearings.

3. The turbomachine according to claim 1, further comprising a ref lux line connected to an interior portion of said machine housing, said reflux line leading back to a gas line on a low-pressure side of said stage housing, or to a low-pressure region of said stage housing itself, and allowing gas introduced into said machine housing to be returned.

4. The turbomachine according to claim 1, wherein said electric machine comprises an electric motor and said rotor disk comprises a compressor rotor disk, or said electric machine comprises a generator and said rotor disk comprises a turbine rotor disk.

5. The turbomachine according to claim 1, further comprising a second rotor disk arranged on a second end of said rotor shaft, in overhung manner.

6. The turbomachine according to claim 1, wherein said shaft bearings comprise magnetic bearings, gas bearings, roller bearings, or hydraulic slide bearings.

7. The turbomachine according to claim 1, wherein said machine housing comprises a pressure-tight capsule suitable for operation in an environment at risk of explosion.

8. A process for preventing an uncontrolled cool-out of a turbomachine used at cryogenic temperatures comprising the steps of:
   (a) providing a turbomachine comprising a rotor shaft having a first shaft end, at least one rotor disk arranged in overhung manner at the first shaft end, a stage housing surrounding the at least one rotor disk and having a plurality of connections for a cold gas flowing through the rotor disk along a flow path, a machine housing connected with the stage housing, an electric machine arranged in the machine housing comprising a stator having a plurality of windings and an electric rotor arranged on the rotor shaft, and a plurality of shaft bearings for said rotor shaft arranged in said machine housing;

(b) arranging a ring gap between the stator and the rotor;

(C) preventing an uncontrolled cool-out of the electric machine by arranging a partition made of insulating material between said stage housing and said machine housing, the partition thermally separating the stage housing from the machine housing;

(d) adjusting cooling of the electric machine in targeted manner by connecting a line comprising a flow-through regulation fitting to the flow path of the cold gas for branching off and passing an amount-regulated cooling stream to the electric machine; and (e) connecting a distributor to the line to distribute the cooling stream into partial streams, the ring gap and the windings being impacted with the partial streams.

9. The process according to claim 8, wherein the partial streams also impact the shaft bearings.

10. The process according to claim 8, further comprising the step of connecting a reflux line to an interior portion of the machine housing, the ref lux line leading back to a gas line on a low-pressure side of the stage housing, or to a low-pressure region of said stage housing itself, and allowing gas introduced into said machine housing to be returned.

11. The process according to claim 8, wherein the electric machine comprises an electric motor and the rotor disk comprises a compressor rotor disk, or the electric machine comprises a generator and the rotor disk comprises a turbine rotor disk.

12. The process according to claim 8, further comprising the step of arranging a second rotor disk on a second end of the rotor shaft, in overhung manner.

13. The process according to claim 8, wherein the shaft bearings comprise magnetic bearings, gas bearings, roller bearings, or hydraulic slide bearings.

14. The process according to claim 8, wherein the machine housing comprises a pressure-tight capsule suitable for operation in an environment at risk of explosion.

* * * * *

UNITED STATES PATENT AND TRADEMARK OFFICE
CERTIFICATE OF CORRECTION

PATENT NO. : 7,193,341 B2 Page 1 of 1
APPLICATION NO. : 10/894970
DATED : March 20, 2007
INVENTOR(S) : Bosen It is certified that error appears in the above-identified patent and that said Letters Patent is hereby corrected as shown below:

In particular, in Column 4, line 42 (Line 2 of Claim 3), please change "ref lux" to correctly read: --reflux--.
In column 6, line 3 (Line 3 of Claim 10), please change "ref lux" to correctly read: --reflux--.

Signed and Sealed this

Seventh Day of August, 2007

JON W. DUDAS
*Director of the United States Patent and Trademark Office*